United States Patent [19]

Willems

[11] Patent Number: 5,426,680
[45] Date of Patent: Jun. 20, 1995

[54] METHOD FOR REMOVING CONTROL ROD DRIVE USING TOOL TO VERIFY CONTROL ROD DRIVE UNCOUPLING

[75] Inventor: Daniel E. Willems, St. Marys, Ga.

[73] Assignee: General Electric Company, Schenectady, N.Y.

[21] Appl. No.: 280,913

[22] Filed: Jul. 27, 1994

Related U.S. Application Data

[62] Division of Ser. No. 150,309, Nov. 12, 1993.

[51] Int. Cl.$^6$ ............................................. G21C 17/12
[52] U.S. Cl. .................................... 376/258; 376/259
[58] Field of Search ................ 376/248, 258, 259, 260

[56] References Cited

U.S. PATENT DOCUMENTS 4,053,355 10/1977 Vuckovich ........................... 376/258
4,158,600 6/1979 Akimoto et al. ..................... 376/260

Primary Examiner—Daniel D. Wasil
Attorney, Agent, or Firm—James E. McGinness

[57] ABSTRACT

A method for removing a CRD with the position indicator probe in place. The method allows probe removal to be performed in a low-dose area, thereby effectively reducing the exposure received by the crew removing the probe to nearly zero. An electronic monitoring tool is provided for continuous CRD uncoupled monitoring during drive removal, using the position indicator probe to verify that the drive is uncoupled. The tool is mounted on the CRD removal equipment. The monitoring circuit is connected to selected position switches inside the position indicator probe. These switches are closed when a ring magnet on the drive piston is in proximity to the respective switch. The detected state of the switches can be used to determine whether the index tube/drive piston assembly is being extended as the CRD is lowered out of the housing. Indicator lights are activated to annunciate a coupled condition wherein the index tube is displacing relative to the piston tube as the CRD is lowered. In response to this annunciation, removal will be discontinued until the drive has been uncoupled.

9 Claims, 8 Drawing Sheets

METHOD FOR REMOVING CONTROL ROD DRIVE USING TOOL TO VERIFY CONTROL ROD DRIVE UNCOUPLING

This is a divisional of U.S. patent application Ser. No. 08/150,309, filed on Nov. 12, 1993.

FIELD OF THE INVENTION

This invention relates generally to maintenance of a control rod drive of a boiling water reactor. Specifically, the invention relates to tools for removal of a control rod drive during the exchange process.

BACKGROUND OF THE INVENTION

Control rod drives (CRDs) are used to position control rods in boiling water reactors (BWRs) to control the fission rate and fission density, and to provide adequate excess negative reactivity to shutdown the reactor from any normal operating or accident condition at the most reactive time in core life. Referring to FIG. 1, each CRD is mounted vertically in a CRD housing 10 which is welded to a stub tube 8, which in turn is welded to the bottom head of the reactor pressure vessel 4. The CRD flange 6 is bolted and sealed to the flange 10a of the CRD housing 10, which contains ports for attaching the CRD hydraulic system lines 80, 81. Demineralized water supplied by the CRD hydraulic system serves as the hydraulic fluid for CRD operation.

As shown schematically in FIG. 1, the CRD is a double-acting, mechanically latched hydraulic cylinder. The CRD is capable of inserting or withdrawing a control rod (not shown) at a slow controlled rate for normal reactor operation and of providing rapid control rod insertion (scram) in the event of an emergency requiring rapid shutdown of the reactor. A locking mechanism in the CRD permits the control rod to be positioned at 6-inch (152.4-mm) increments of stroke and to be held in these latched positions until the CRD is actuated for movement to a new position. A spud 46 at the top of the index tube 26 (the moving element) engages and locks into a socket at the bottom of the control rod. Once coupled, the CRD and control rod form an integral unit which must be manually uncoupled by specific procedures before a CRD or control rod may be removed from the reactor.

When installed in the reactor, the CRD is wholly contained in housing 10. The CRD flange 6 contains an insert port 66, a withdraw port 70 and an integral two-way check valve (with a ball 20). For normal drive operation, drive water is supplied via an associated hydraulic control unit (HCU) to the insert port 66 for drive insertion and/or to withdraw port 70 for drive withdrawal. For rapid shutdown, reactor pressure is admitted to the two-way check valve from the annular space between the CRD and a thermal sleeve (not shown) through passages in the CRD flange, called scram vessel ports. The check valve directs reactor pressure or external hydraulic pressure to the underside of drive piston 24.

Referring to FIGS. 2A and 2B, the CRD further comprises an inner cylinder 57 and an outer tube 56, which form an annulus through which water is applied to a collet piston 29b to unlock index tube 26. The internal diameter of inner cylinder 57 is honed to provide the surface required for expanding seals 65 on the drive piston 24. A collet housing 51 (which is part of outer tube 56) is provided with ports 73 to permit free passage of water from the clearance space between the outer diameter of index tube 26 and the inner diameter of inner cylinder 57 and the inner diameter of collet housing 51. The bottom of collet piston 29b normally rests against a spacer 52 in the upper portion of the annular space. Grooves in the spacer permit the passage of water between the bottom of the collet piston 29b and the passage area within the cylinder, tube and flange.

Welded pipes 80 and 81, installed in the CRD housing, port water to the insert port 66 and the withdraw port 70 respectively. A port 69 below outer tube 56 connects to withdraw port 70 in CRD flange 6 so that water is applied through the annulus to collet piston 29b when a withdraw signal is given.

The CRD is secured to the CRD housing flange 10a by eight mounting bolts (not shown). A pressure-tight seal is effected between the mated flanges by O-ring gaskets (not shown) mounted in a spacer 7 secured to the CRD flange face.

Insert port 66 contains a ball check valve which consists of check-valve ball 20, ball retainer 21, and retainer O-ring 22. This valve directs HCU accumulator pressure or reactor pressure to the underside of drive piston 24 during scram operation. Port 66 is connected internally to the annulus and the bottom of drive piston 24 and serves as the inlet for water during normal insertion or scram. Water enters this port for a brief period in response to a withdraw signal to move the index tube 26 upward so that collet fingers 29a are cammed out. Following this brief unlocking period, water from below drive piston 24 is discharged through port 66 and through the under-piston hydraulic line for the duration of the withdraw signal. During the time the CRD remains stationary, cooling water passes through an annulus internal to flange 6 to the area between outer tube 56 and the inside of the thermal sleeve to cool the CRD.

The withdraw port 70 serves as the inlet port for water during control rod withdrawal and as the outlet port for water during normal or scram insertion. It connects with internal porting and annuli to the area above drive piston 24. During a withdraw operation, water is supplied from port 70 through a small connecting port in CRD flange 6 to the annular space between outer tube 56 and inner cylinder 57 for application to the bottom of collet piston 29b.

The locking mechanism consists of collet fingers 29a, collet piston 29b, barrel 35, guide cap 39, and collet spring 31. The mechanism is contained in the collet housing 51 portion of outer tube 56 and is the means by which index tube 26 is locked to hold the control rod at a selected position.

The collet assembly consists of a collet piston 29b fitted with four expansion piston seal rings 28, six fingers 29a and a retainer (not shown) and is set into a bore in the collet housing 51. In addition, a spring 31, barrel 35 and guide cap 39 complete the components installed in the collet housing 51.

Guide cap 39 is held in place above the collet by three plugs 37 which penetrate the upper end of collet housing 51, and which are held in place by fillister-head screws. It provides a fixed camming surface to guide collet fingers 29a upward and away from index tube 26 when unlocking pressure is applied to collet piston 29b. Barrel 35 is installed below guide cap 39 and serves as fixed seat for collet spring 31.

The collet mechanism requires a hydraulic pressure greater than reactor pressure to unlock for CRD-withdraw movement. A preload is placed on collet spring 31 at assembly and must be overcome before the collet can be moved toward the unlocked position. For control rod withdrawal, a brief insert signal is applied to move index tube 26 upward to relieve the axial load on collet fingers 29a, camming them outward against the sloping lower surface of index tube locking notch 55. Immediately thereafter, withdraw pressure is applied. In addition to moving index tube 26 downward, this pressure is at the same time applied to the bottom of collet piston 29b to overcome the spring pressure and cam the fingers 29a outward against guide cap 39. When the withdraw signal ceases, the spring pressure forces the collet downward so that fingers 29a slip off guide cap 39. As index tube 26 settles downward, collet fingers 29a snap into the next higher notch and lock. When Collet fingers 29a engage a locking notch 55, collet piston 29b transfers the control rod weight from index tube 26 to the outer tube 56.

Unlocking is not required for CRD insertion. The collet fingers are cammed out of the locking notch as index tube 26 moves upward. The fingers 29a grip the outside wall of index tube 26 and snap into the next lower locking notch for single-notch insertion to hold index tube 26 in position. For scram insertion, index tube 26 moves continuously to its limit of travel during which the fingers snap into and cam out of each locking notch as index tube 26 moves upward. When the insert, withdraw or scram pressures are removed, index tube 26 settles back, from the limit of travel, and locks to hold the control rod in the required position.

The drive piston 24 and index tube 26 are the primary subassembly in the CRD, providing the driving link with the control rod as well as the notches for the locking mechanism collet fingers. Drive piston 24 operates between positive end stops, with a hydraulic cushion provided at the upper end only. Index tube 26 is a nitrided stainless-steel tube threaded internally at both ends. The spud 46 is threaded to its upper end, while the head of the drive piston 24 is threaded to its lower end. Both connections are secured in place by means of lock bands 25, 44.

There are 25 notches machined into the wall of index tube 26, all but one of which are locking notches 55 spaced at 6-inch intervals. The uppermost surfaces of these notches engage collet fingers 29b, providing 24 increments at which a control rod may be positioned and preventing inadvertent withdrawal of the rod from the core. The lower surfaces of the locking notches slope gradually so that the collet fingers cam outward for control rod insertion.

Drive piston 24 is provided with internal (62, 71, 72) and external seal rings (65), and is operated in the annular space between piston tube 15 and inner cylinder 57. Internal (63) and external (64) bushings prevent metal-to-metal contact between drive piston 24 and the surface of piston tube 15 and the wall of inner cylinder 57 respectively.

When a control rod is driven upward to its fully inserted position during normal operation or scram, the upper end of the piston head contacts the spring washers 30 which are installed below the stop piston 33. Washers 30 and stop piston 33 provide the upper limit of travel for drive piston 24. The spring washers, together with the series of buffer orifices 53 in the upper portion of piston tube 15, effectively cushion the moving drive piston 24 and reduce the shock of impact when the piston head contacts the stop piston.

The magnet housing, which comprises the lower end of drive piston 24, contains a ring magnet 67 which actuates the switches inside a position indicator probe 12a to provide remote electrical signals indicating control rod position.

The piston tube assembly forms the innermost cylindrical wall of the CRD. It is a welded unit consisting of piston tube 15 and a position indicator tube 61. The piston tube assembly provides three basic functions for CRD operation: (a) position indicator tube 61 is a pressure-containing part which forms a drywell housing for position indicator probe 12a (see FIG. 2A); (b) piston tube 15 provides for the porting of water to or from the upper end of the piston head portion of drive piston 24 during rod movement; and (c) during control rod scram insertion, buffer orifices 53 in piston tube 15 progressively shut off water flow to provide gradual deceleration of drive piston 24 and index tube 26.

A stud 59 is welded to the upper end of tube piston 5. Stud 59 is threaded for mounting the stop piston 33. A shoulder on the stud, just below the threaded section, is machined to provide a recess for the spring washers 30 that cushion the upward movement of drive piston 24.

The tube section 15a and head section 15b of piston tube 15 provide space for position indicator tube 61, which is welded to the inner diameter of the threaded end of head section 15b and extends upward through the length of tube section 15a, terminating in a water-tight cap near the upper end of the tube section. Piston tube 15 is secured by a nut 16 at the lower end of the CRD. Two horizontal ports are provided in the head section 15b, 180° apart, to transmit water between the withdraw porting in the CRD flange and the annulus between indicator tube 61 and tube section 15a of piston tube 15 for application to the top of drive piston 24. Three O-ring seals 18 are installed around head section 15b. Two seal the bottom of the CRD against water leakage and one seals the drive piston 24 under-piston pressure from the drive piston over-piston pressure.

A position indicator probe 12a is slidably inserted into indicator tube 61. As shown in FIGS. 2A and 4, probe 12a is welded to a plate 12b, which plate is in turn bolted to housing 12. Housing 12 is secured to the CRD ring flange 17 by screws 13. A cable clamp 11, located at the bottom of a plug 106, secures a connecting electrical cable (not shown) to plug 106. Ring flange 17 is in turn secured to the CRD housing by screws 9. Thus, probe 12a, housing 12 and cable clamp 11 (with the cables passing therethrough) can be removed as a unit.

Probe 12a includes a switch support 103 with 53 reed switches and a thermocouple for transmitting electrical signals to provide remote indications of control rod position and CRD operating temperature. Only switches S48, S49 and S50 are shown in FIG. 4. The reed switches are connected by electrical wires 105 to a receptacle 14, which receives plug 106. The plug and receptacle are standard electrical components with 27 pins and sockets respectively. Housing 12 serves as a protective covering for the electrical wires 104.

The switch support assembly consists of a switch support 103 and a flange (not shown). The switch support 103 has two channels extending its full length which provide for mounting of the position switches on two sides of the support. A thin-walled protective tube 107 is installed over the length of the switch support. Tube 107 is held in place by a split rivet (not shown) which penetrates the switch support at the upper end. The 53 reed switches are identical and are attached to switch support 103 by spring clips 109. Each switch is encased in a silicone-impregnated fiberglass sleeve for insulation. The switches are normally open and are closed individually during CRD operation by ring magnet 67 installed in the bottom of drive piston 24.

The stop piston 33 threads onto the stud 59 at the upper end of piston tube 15. This piston provides the seal between reactor pressure and the area above the drive piston. It also functions as a positive-end stop at the upper limit of drive piston travel. Six spring washers 30 below the stop piston help absorb the final mechanical shock at the end of travel. Seals 34 include an upper pair used to maintain pressure above the drive piston during CRD withdrawal and a lower pair used only during the cushioning of the drive piston at the upper end of the stroke. Two external bushings 32 prevent metal-to-metal contact between stop piston 33 and index tube 26.

As seen in FIG. 3, spud 46, which connects the control rod 90 and the CRD, is threaded onto the upper end of index tube 26 and held in place by locking band 44. The coupling arrangement will accommodate a small amount of angular misalignment between the CRD and the control rod. Six spring fingers permit the spud to enter the mating socket 92 on the control rod. A lock plug 94 then enters spud 46 from socket 92 and prevents uncoupling.

Two uncoupling mechanisms are provided. The lock plug 94 may be raised against the return force of a spring 95 by an actuating shaft 96 which extends through the center of the control rod velocity limiter to an unlocking handle (not shown). The control rod, with lock plug 94 raised, may then be lifted from the CRD. The lock plug may also be raised from below to uncouple the CRD from below the reactor vessel. To accomplish this, a special tool is attached to the bottom of the CRD and used to raise the piston tube 15 (see FIG. 2B). This raises an uncoupling rod, lifting lock plug 94 so that spud 46 disengages from the control rod coupling socket 92.

The uncoupling rod consists of a rod 48 and a tube 43, supported in the base of the spud at the upper end of the CRD. The rod 48 is welded to the flared end of tube 43 such that a dimension of 1.125 inch exists between the top of rod 48 and the top end of spud 46. This is a critical dimension and must be maintained to ensure proper CRD-and control-rod coupling. For this reason, uncoupling rods cannot be interchanged unless the critical dimension is verified. In addition to its function in uncoupling, rod 48 positions the control rod lock plug 92 such that it supports (i.e., opposes radially inward deflection of) the spud fingers when the control rod and CRD are coupled.

In order to perform maintenance on a CRD, the CRD must be removed from the CRD housing. To accomplish this, the CRD must first be uncoupled from the control rod. Conventional practice is to remove the position indicator probe from the CRD prior to drive removal. The purpose is to allow access by an uncoupling tool in the space occupied by the probe. The uncoupling tool is used for final determination that the CRD is uncoupled from the control rod prior to lowering the drive out of its housing. The uncoupling tool is also used to uncouple the drive from the control rod from beneath the RPV, but often this function is performed from the refueling floor.

All work performed under vessel is in a high-radiation area and reduction of any time or tasks in the under vessel area results in a reduction in the overall radiation exposure accrued by the utility during an outage. The removal of the position indicator probe under vessel contributes approximately one man-rem to the total radiation exposure received by the crew performing the CRD exchange.

SUMMARY OF THE INVENTION

The present invention is a method for removing a CRD with the position indicator probe in place. This allows probe removal to be performed in a low-dose area, thereby effectively reducing the exposure received by the crew removing the probe to nearly zero.

A further feature of the invention is an electronic tool for continuous CRD uncoupled monitoring during drive removal. The tool uses the position indicator probe to verify that the drive is uncoupled. The electronic monitoring tool is mounted on the CRD removal equipment. The monitoring circuit is connected to selected position switches inside the position indicator probe, which is installed in the stationary CRD piston tube. These selected switches are normally open and are closed when a ring magnet on the movable drive piston is in proximity to the respective switch. Accordingly, the position of the index tube/drive piston assembly, and the control rod coupled thereto via the spud, can be determined from the state of the position switches.

The detected state of the switches can be used to determine whether the index tube/drive piston assembly is being extended relative to the piston tube, as the CRD is lowered during the initial stage of removal. Indicator lights are activated in dependence on the position of the ring magnet on the drive piston relative to selected position switches. These lights annunciate a coupled condition wherein the index tube is displacing relative to the piston tube, due to coupling with the control rod, as the unbolted CRD flange is lowered. In response to this annunciation, removal will be discontinued until the drive has been uncoupled.

DETAILED DESCRIPTION OF THE PREFERRED EMBODIMENT

Figure 4:
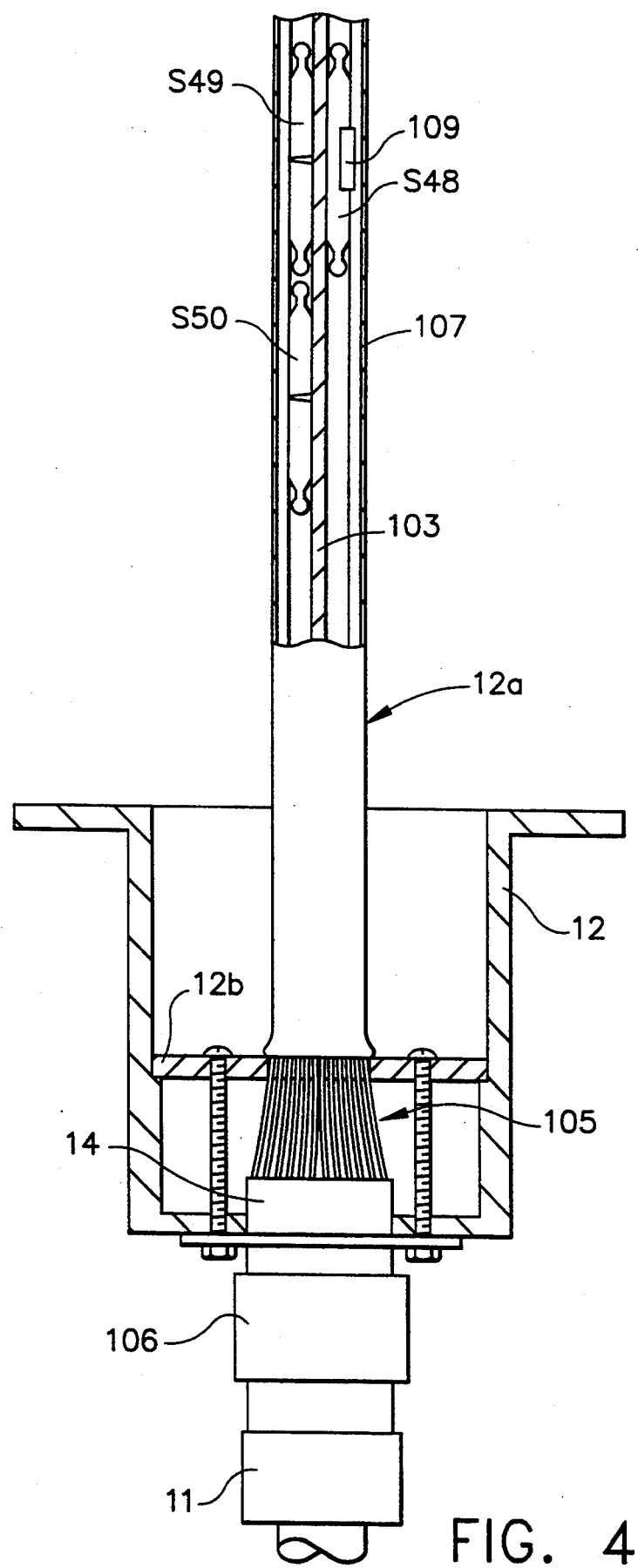
FIG. 4 is a partial sectional view of a conventional position indicator probe.
Figure 5:
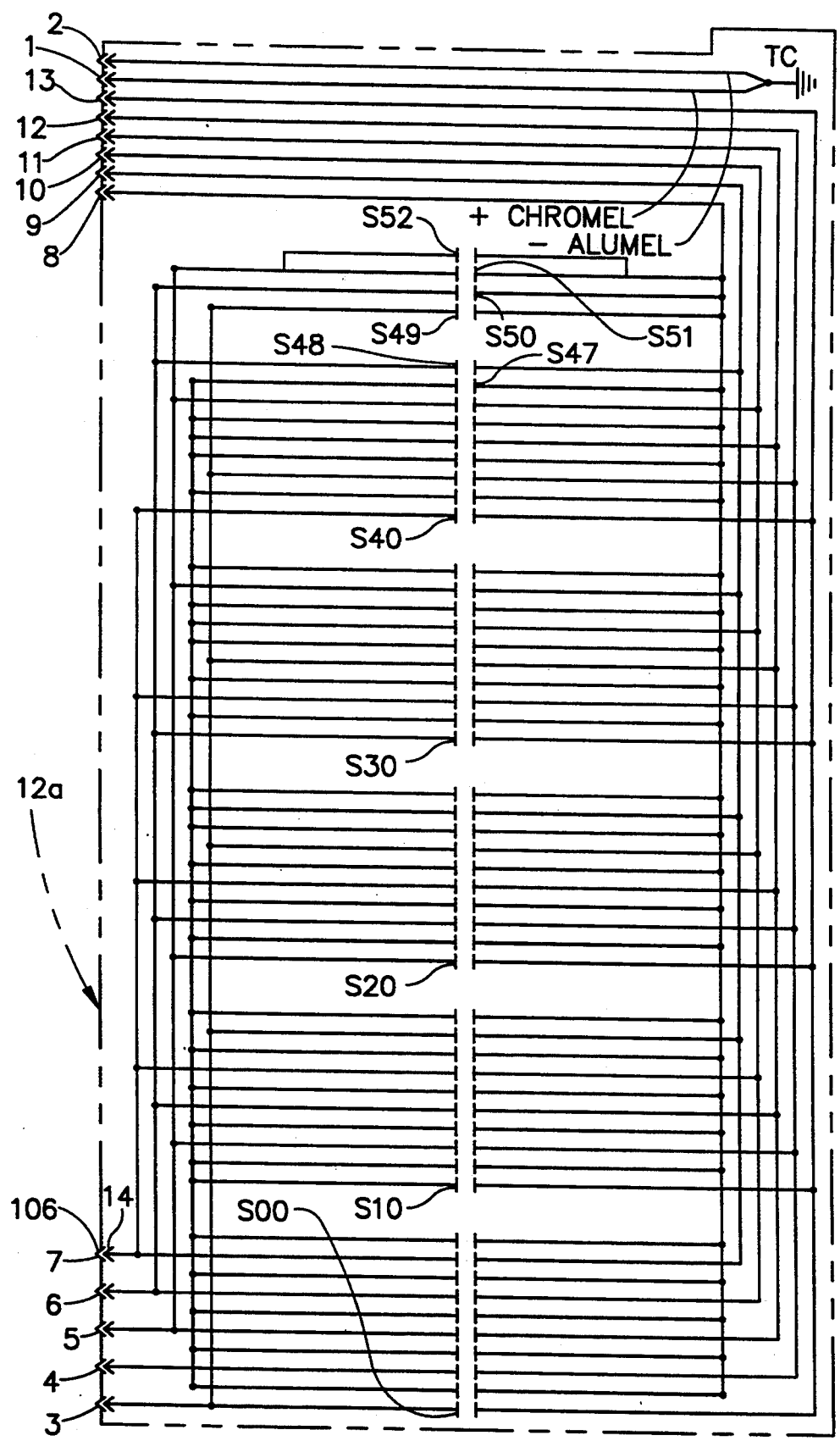
FIG. 5 is a circuit diagram of the position switches in a typical position indicator probe.

A conventional position indicator probe has 53 position switches (see FIG. 5), usually designated S00 to S52. Forty-nine of the reed switches are spaced at equal 3-inch intervals on the switch support 103 (FIG. 4), providing an indication signal at each locking position and at the halfway point between each locking position. These switches are closed one at a time to transmit signals to the rod position information system (not shown), which in turn energizes the corresponding rod position display in the control room.

Figure 1:
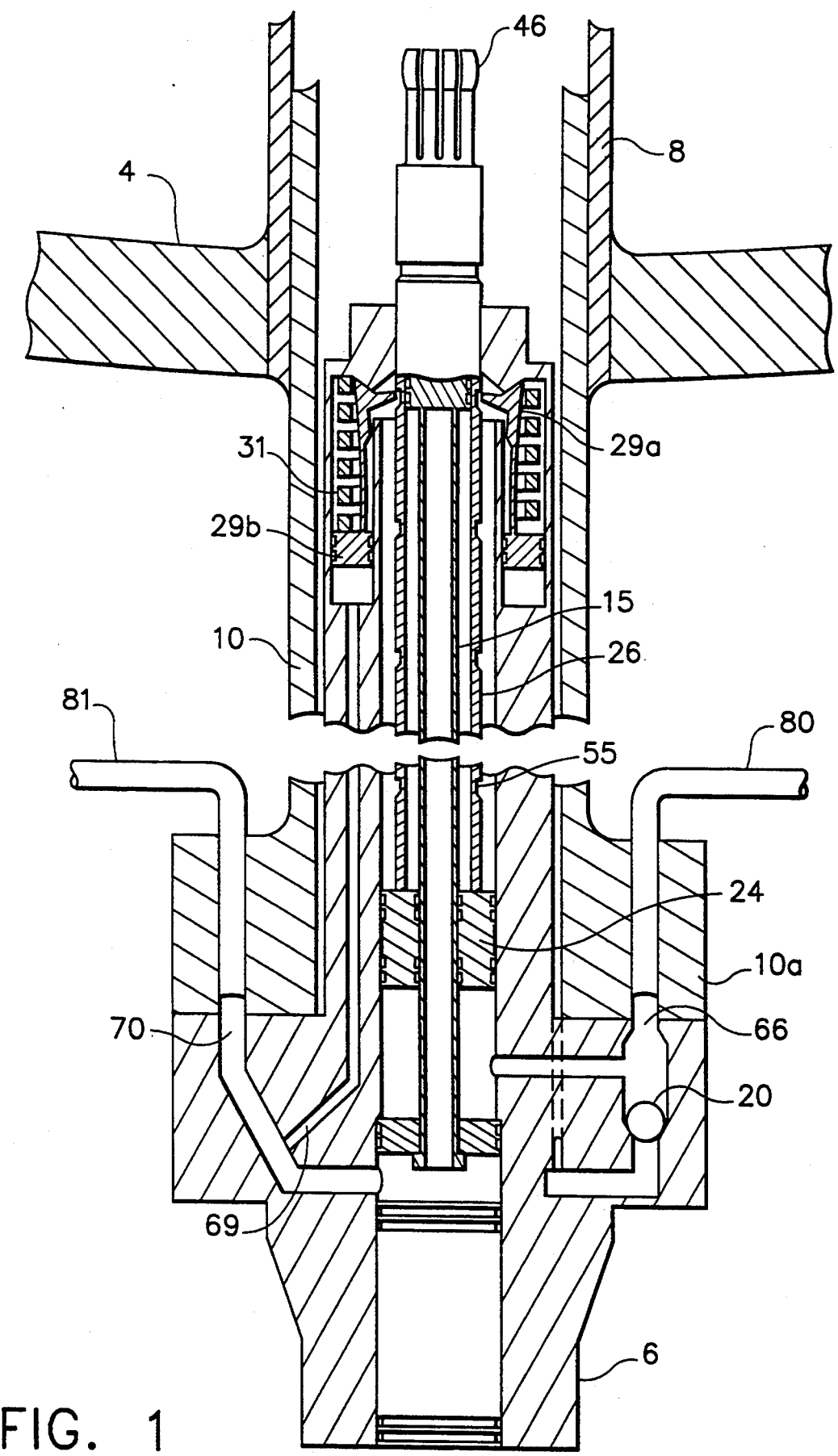
FIG. 1 is a sectional schematic of a conventional control rod drive installed in a BWR.

The control room digital displays resulting from the closing of these 49 switches range from "00" (control rod fully inserted into the core) to "48" (control rod withdrawn to the backseat position). The switches in the position indicator probe are assigned corresponding number designations, S00 to S48. The even-numbered switches correspond with the locking positions and the backseat position of the index tube 26 (FIG. 1); the odd-numbered switches correspond with the intermediate positions on the index tube.

Figure 2A:
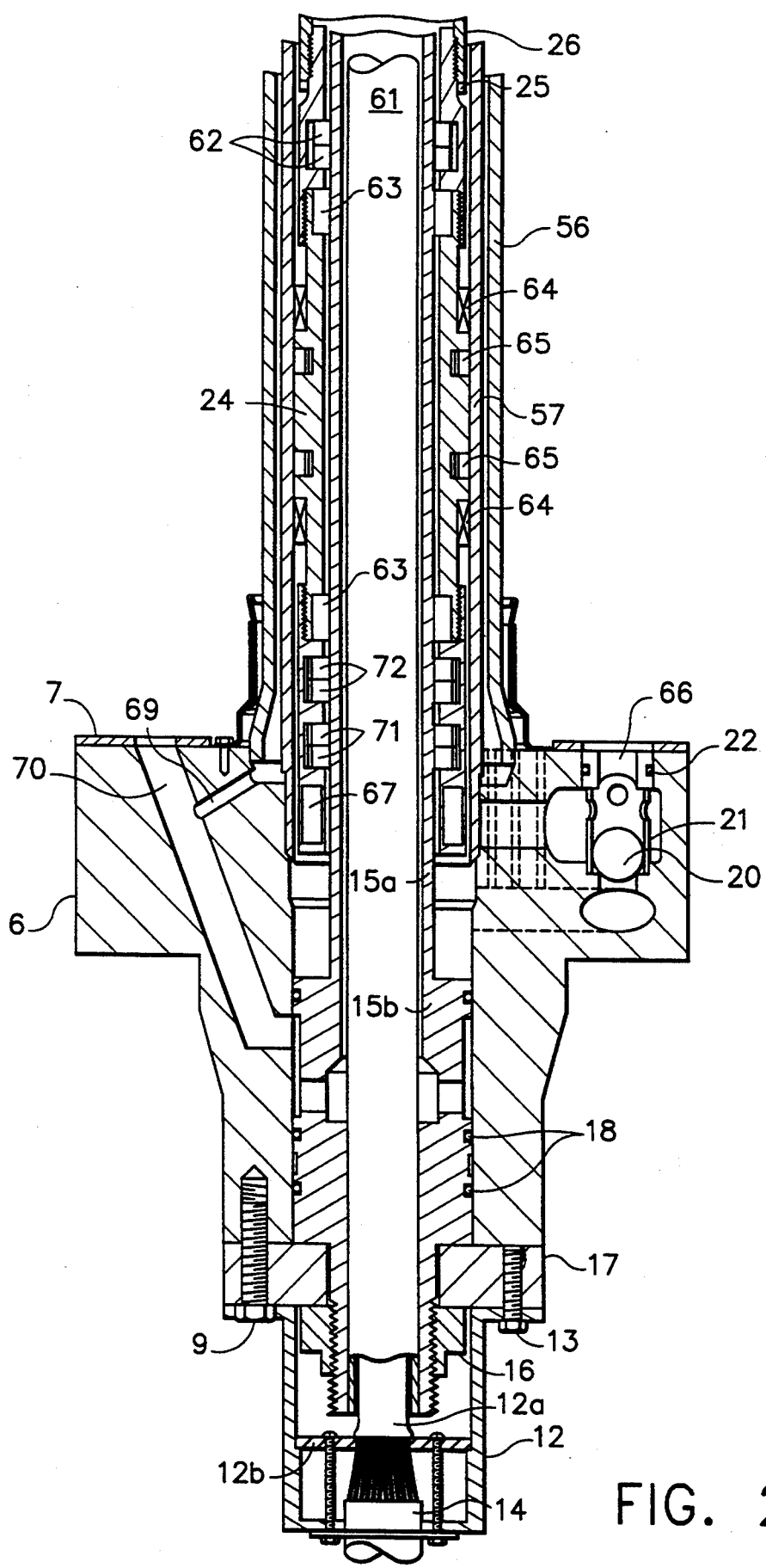
FIGS. 2A and 2B are sectional views of the lower and upper portions respectively of a conventional control rod drive.
Figure 2B:
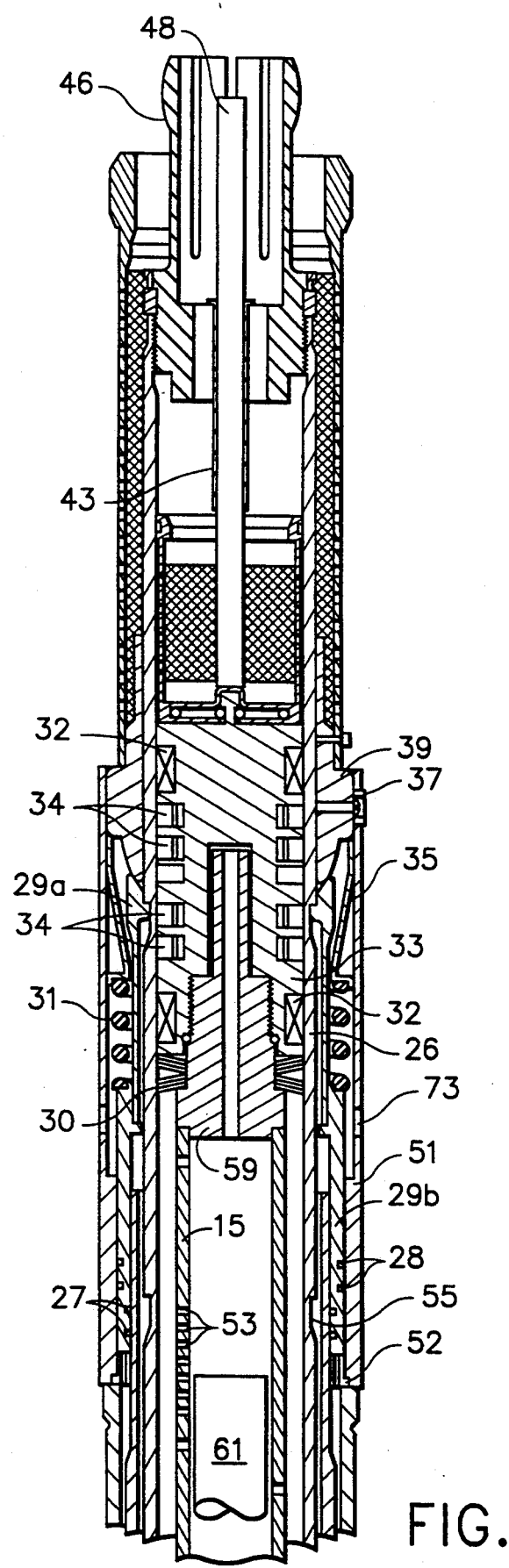
Figure 3:
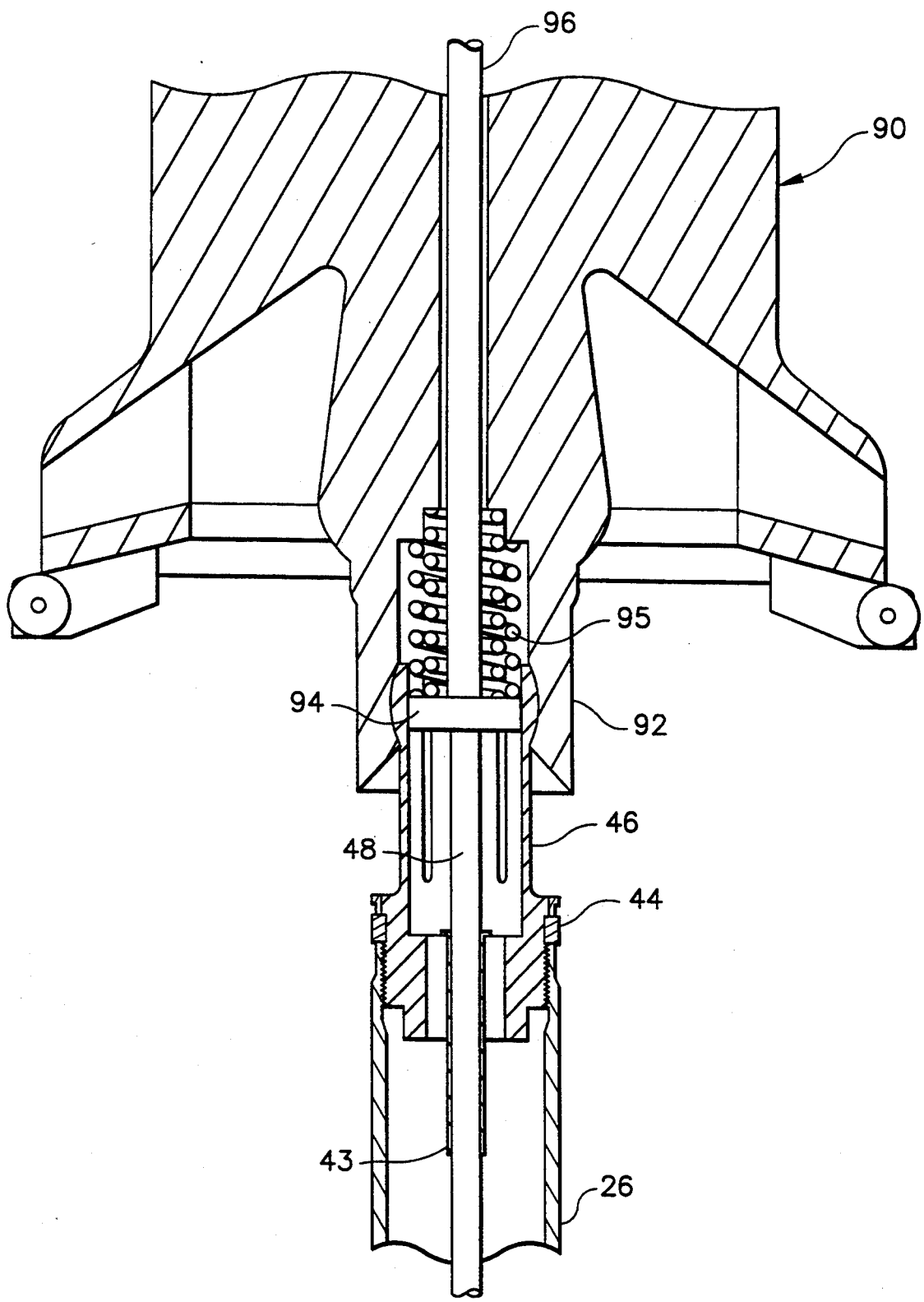
FIG. 3 is a sectional view of a conventional coupling of a control rod drive to a control rod.

Switches S00, S51 and S52, located at the top of position indicator probe 12a (FIG. 2A), provide the control room with a signal indicating "rod full in". Switch S49, located near the bottom of the probe and on the opposite side of switch support 103 from switch S48 (see FIG. 4), closes simultaneously with switch S48 to provide the control room with a signal of "rod full out". Switch S50 is installed 2 inches below the normal full-out position of the CRD, i.e., at the so-called "overtravel" position. Since the limit of drive piston down travel is provided by the backseat position of the control rod in the reactor vessel guide tube (not shown), switch S50 is closed only when the control rod and CRD are uncoupled and, when closed, provides the control room with an annunciation of this condition. The present invention utilizes switches S47, S49 and S50, during CRD removal, to monitor CRD uncoupling, as described in detail hereinafter.

Figure 6:
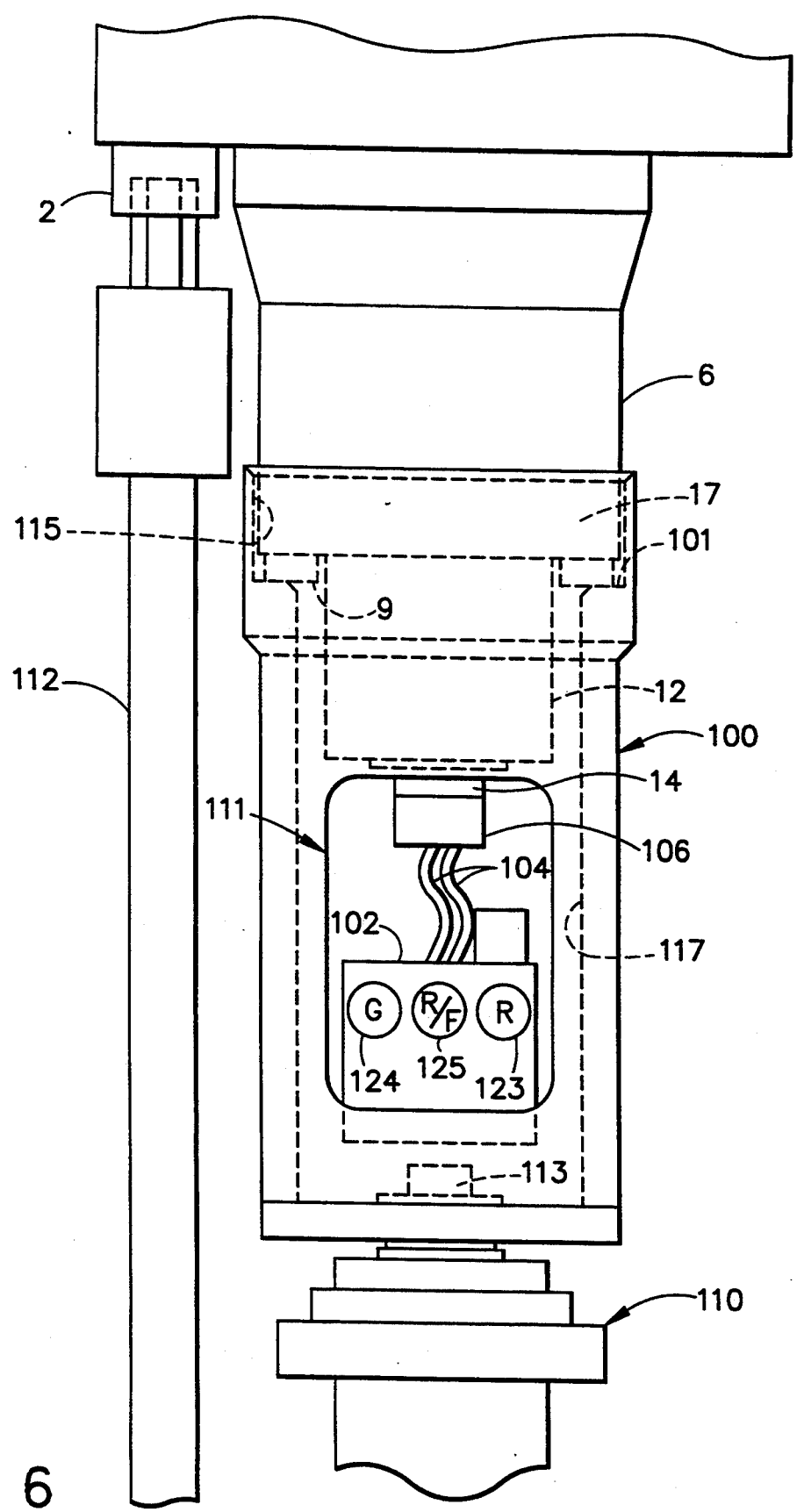
FIG. 6 is a plan view of an apparatus for monitoring CRD uncoupling during CRD removal in accordance with a preferred embodiment of the invention.

In accordance with a preferred embodiment of the invention depicted in FIG. 6, the means for supporting the CRD during removal comprise a generally circular cylindrical bucket adaptor 100 coupled to an extension tube 110 by a pin 113. The adaptor has a first circular cylindrical chamber 115 of diameter slightly greater than that of the ring flange 17 and a second circular cylindrical chamber 117 of diameter less than that of the ring flange 17 and greater than that of position indicator probe housing 14. These chambers are connected by way of a seat 101 on which ring flange mounting bolts 9 bear. Seat 101 is preferably an annular horizontal surface having an inner diameter which is less than the diameter of a pitch circle circumscribing the heads of ring flange mounting bolts 9. Extension tube 110 supports the CRD by way of bucket adaptor 100 after the mounting bolts 2 are unscrewed using a conventional de-torquing tool 112.

Before the bucket adaptor/extension tube assembly is installed, an electronic monitoring tool 102 is connected to receptacle 14 of the position indicator probe assembly (see FIG. 6) via a plug 106 and shielded cables 104. Plug 106 fits snugly into receptacle 14, allowing tool 102 to be suspended via the shielded cables.

Bucket adaptor 100 has a chamber for receiving the suspended monitoring tool 102. A window 111 is provided to allow observation of indicator lights 123–125 which are visible through a transparent enclosure (e.g., made of LEXAN TM pipe) of electronic monitoring tool 102.

In accordance with the CRD removal method of the present invention, the position indicator probe 12a can be left in place inside the position indicator tube 61 and used to monitor the state of CRD coupling/uncoupling. A green LED 124 lights when ring magnet 67 is aligned with switch S50, indicating that the index tube is in the overtravel position, i.e., the CRD is uncoupled from the control rod. This condition indicates that the CRD can be safely removed from the CRD housing. A red LED 123 lights when ring magnet 67 (FIG. 2A) is aligned with either of switches S48 or S49, indicating that the index tube is in the backseat position or the adjacent intermediate position, respectively. In either case, the CRD should be pushed back into the housing and then uncoupled from the control rod. Switch S47 indicates that the index tube is extended just short of the first locking position (corresponding to switch S46) and also lights the red LED 123. Extension to the first locking position is to be avoided since the CRD cannot be simply pushed back in to retract the index tube. Finally, a flashing red LED 125 flashes when the ring magnet 67 is between adjacent switches, i.e., all position switches S00 to S52 are open. For example, green LED 124 might be lit, indicating that the CRD can be removed, but upon lowering of the CRD, the flashing red LED is activated, along with a pulsed horn 129 (see FIG. 7). The flashing red light and pulsed horn warn the crew that the CRD is not uncoupled and that CRD removal should be halted.

Figure 7:
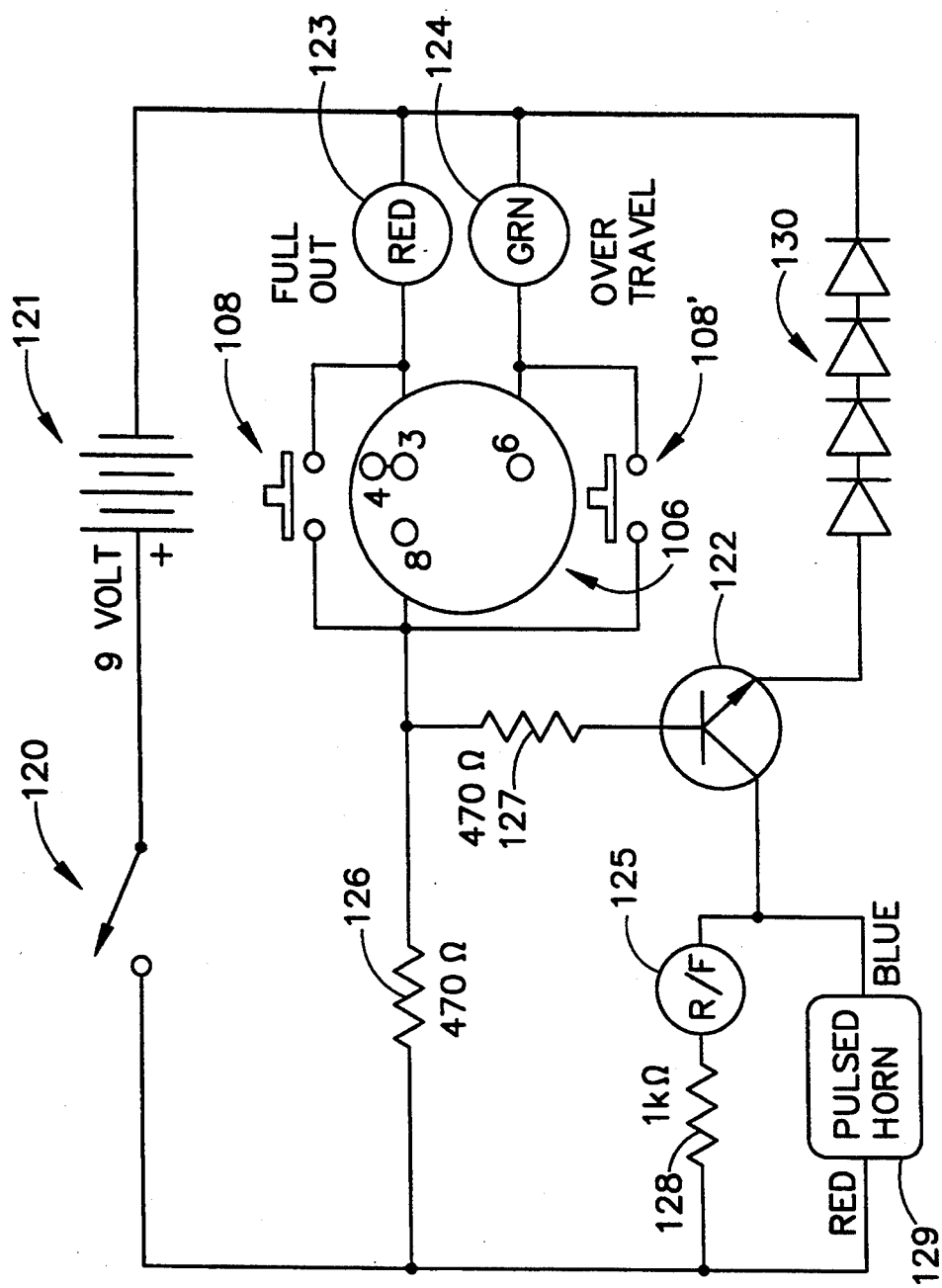
FIG. 7 is a circuit diagram for an exemplary embodiment of the electronic monitoring tool in accordance with the invention.

The monitoring circuit in accordance with the preferred embodiment of the invention is shown in FIG. 7 connected to pins 3, 4, 6 and 8 of plug 106. Pin 8 is connected to ground; pins 3, 4 and 6 are respectively connected to switches S49 (or S48), S47 and S50 (see FIG. 5). A first circuit loop is formed by a closed ON/OFF switch 120, a dc voltage source 121 (e.g., a 9-volt battery), red LED 123, a closed switch S47 or S49 connected to pin 3, and a resistor 126 (470 Ω). Red LED 123 is activated when switch S47 or S49 is closed. Alternatively, green LED 124 is activated when switch S50, connected to pin 6, is closed. The light-emitting diodes 123 and 124 can be tested by pressing test pushbuttons 108 and 108', respectively.

A switching transistor 122 (e.g., 2N1711 or its equivalent) has its base coupled to the positive terminal of the voltage source via resistors 126 and 127 (both 470 Ω) connected in series. The emitter of transistor 122 is connected to the positive terminal of the voltage source via a parallel network: one line consisting of a resistor 128 (1 kΩ) and flashing red LED 125 connected in series, and the other line consisting of a pulsed horn 129. The collector of transistor 122 is connected to the negative terminal of the voltage source via a series of diodes 130 (e.g., 1N914). When switches S47, S49 and S50 are all open, transistor 122 is biased to switch on the flashing red LED 125 and the pulsed horn 129.

Using the monitoring circuit shown in FIG. 7, a CRD can be removed from a CRD housing with its position indicator probe in place. A signal is activated to indicate that the index tube occupies a position corresponding to CRD uncoupling from the control rod, i.e., the CRD is ready to be removed from its housing. In the event that the CRD is not uncoupled, another signal will be activated as the index tube, which is still coupled at its end to the control rod via the spud, is extended relative to the descending CRD.

The preferred embodiments of the bucket adaptor and electronic monitoring tool have been disclosed for the purpose of illustration. Variations and modifications of the disclosed structure which do not depart from the concept of this invention will be readily apparent to mechanical engineers skilled in the art of monitoring devices. Also it should be borne in mind that different nuclear reactors may have switch or pin numbering schemes different than those disclosed herein. All such variations and modifications are intended to be encompassed by the claims set forth hereinafter.

I claim:

1. A tool for indicating that a control rod drive is coupled to an associated control rod in a nuclear reactor, comprising:

first detecting means for detecting the state of a first position switch inside a position indicator probe of said control rod drive during removal of said control rod drive from a control rod drive housing; and first indicating means for providing an indication in response to a signal from said first detecting means produced when said first position switch has a closed state.

2. The tool as defined in claim 1, further comprising a battery voltage source coupled to said first detecting means.

3. The tool as defined in claim 1, wherein said first indicating means is a light-emitting diode.

4. The tool as defined in claim 1, wherein said first position switch corresponds to an overtravel position of an index tube of said control rod drive, said overtravel position being attainable only if said control rod drive is uncoupled from said associated control rod.

5. The tool as defined in claim 5, further comprising:

second detecting means for detecting the state of a second position switch inside said position indicator probe during removal of said control rod drive; and second indicating means for providing an indication in response to a signal from said second detecting means produced when said second position switch has a closed state.

6. The tool as defined in claim 5, wherein said second position switch corresponds to a "rod full out" position of said index tube, said "rod full out" position being attainable during control rod drive removal only if said control rod drive is coupled to said associated control rod.

7. The tool as defined in claim 5, wherein said first, and second indicating means are light-emitting diodes of different color.

8. The tool as defined in claim 5, further comprising a transparent housing enclosing said first and second indicating means.

9. The tool as defined in claim 5, further comprising:

switching means for providing an output signal in response to signals from said first and second detecting means produced when said first and second position switches both have open states during control rod drive removal; and third indicating means for providing an indication in response to said output signal from said switching means.

* * * * *